Figure 16:
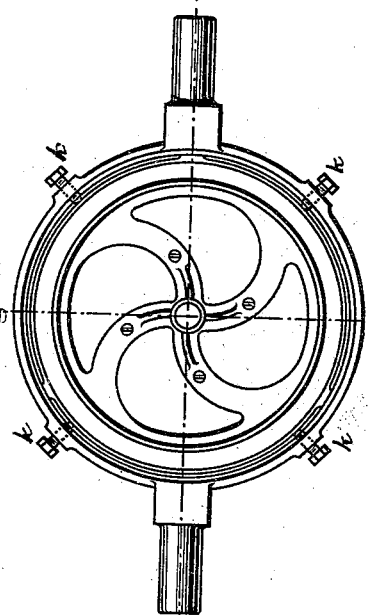

(No Model.) 3 Sheets—Sheet 1.
G. WOOLNOUGH.
Pattern Block for Molding Purposes.
No. 230,979. Patented Aug. 10, 1880.
Fig.1. Fig.2.
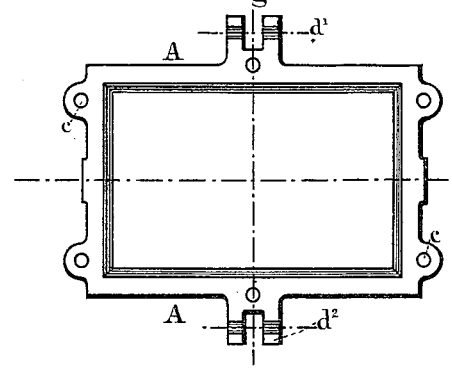
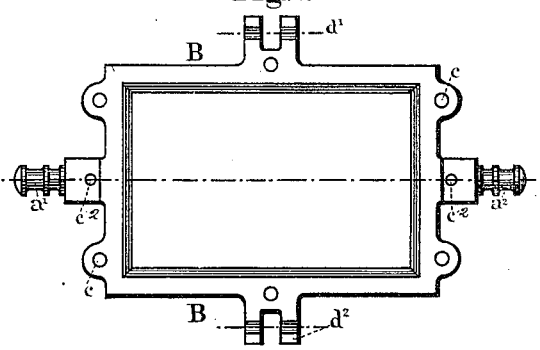
Fig.3. Fig.4ᵇ. Fig.4ᵃ.
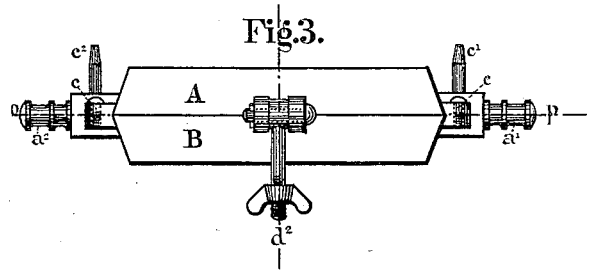
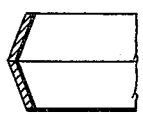
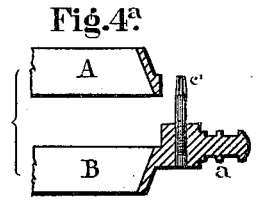
Fig.5. Fig.6.
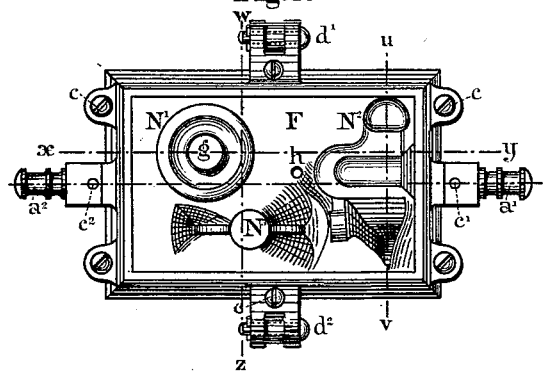
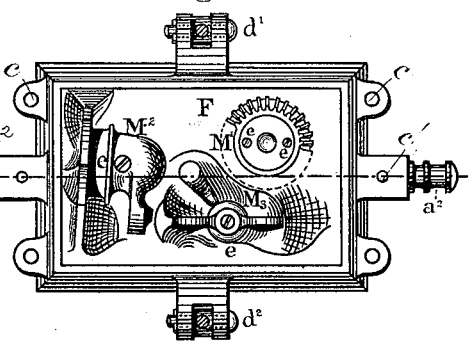
Fig.7. Fig.8. Fig.9.
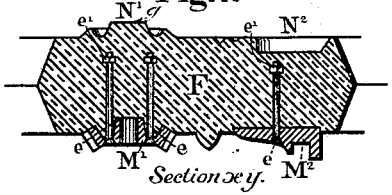
Section x y. Section u v. Section w z.
Witnesses: Inventor:
E. F. Wick Geo. Woolnough,
George. by M. Bailey,
his Attorney
N. PETERS, PHOTO-LITHOGRAPHER, WASHINGTON, D. C.

(No Model.) 3 Sheets—Sheet 2.

G. WOOLNOUGH.
Pattern Block for Molding Purposes.

No. 230,979. Patented Aug. 10, 1880.

Witnesses:

Inventor:
Geo. Woolnough,
by M. Bailey
his Atty.

(No Model.) 3 Sheets—Sheet 3.
G. WOOLNOUGH.
Pattern Block for Molding Purposes.
No. 230,979. Patented Aug. 10, 1880.
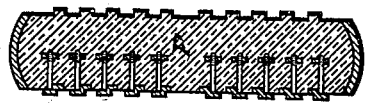
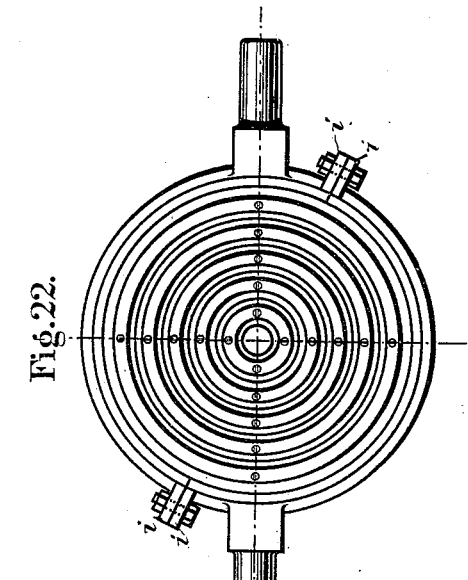
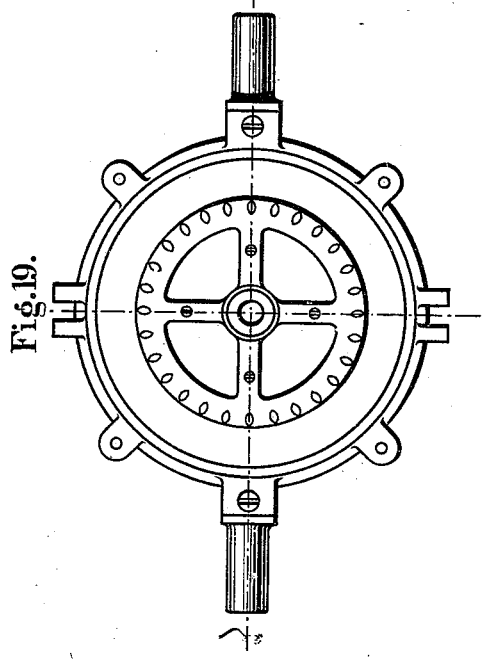
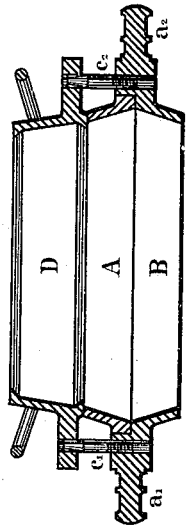
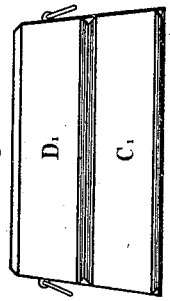
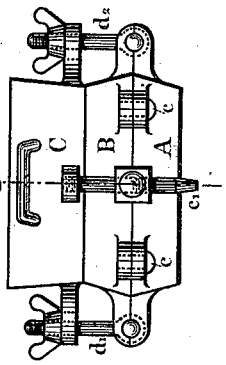
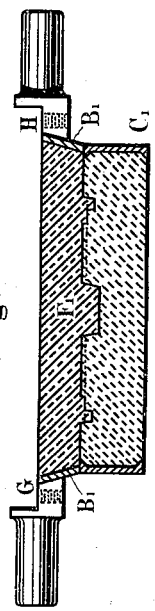
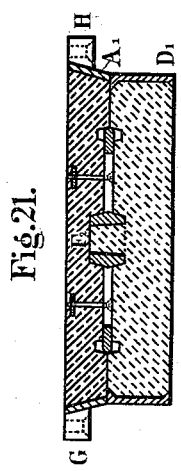
Witnesses:
Inventor:
Geo. Woolnough
by M Bailey
his Atty.

UNITED STATES PATENT OFFICE.

GEORGE WOOLNOUGH, OF HALBERSTADT, PRUSSIA, ASSIGNOR TO HIMSELF AND FRIEDRICH DEHNE, OF SAME PLACE.

PATTERN-BLOCK FOR MOLDING PURPOSES.

SPECIFICATION forming part of Letters Patent No. 230,979, dated August 10, 1880.

Application filed May 25, 1880. (No model.) Patented in England June 2, 1879.

*To all whom it may concern:*

Be it known that I, GEORGE WOOLNOUGH, of Halberstadt, Prussia, have invented new and useful Improvements in Patterns for Molding Purposes, of which the following is a specification.

My invention relates to improvements in the process of molding described in the specification of the English Patent, A. D. 1876, No. 2,456. This process consists mainly in casting the patterns out of metal, together with a pattern-plate provided with journals, and subsequently making use of such pattern-plate for preparing the molds in which the desired article is to be cast.

The essential feature of the present invention consists in substituting for the said pattern-plate a casting made out of plaster-of-paris, cement, an easily-fusible metal, or of any other suitable material, which casting is incased around its sides by a metal frame adapted to hold the same securely, and provided with journals fitting to the bearings of the molding-machine. The said casting is to be called the "pattern-block," while the journaled frame will be termed "pattern-block frame," or simply "pattern-frame."

On the annexed three sheets of drawings pattern-frames of different shapes and the mode of using them for making and handling the pattern-blocks are represented.

Figures 1, 2, 3, and 4 show a rectangular pattern-frame consisting of two parts, Figs. 1 and 2 representing these parts A and B separated from each other in plan, while Fig. 3 shows them in elevation and united, and Figs. 4ª and 4ᵇ in section.

The walls of the two parts are inclined in opposite directions, so that when the parts are united by screws or bolts $c$ they will securely hold the pattern-block. This object may also be attained by a ledge at the top of A and the bottom of B, or in other suitable manner.

The part B is provided with the journals $a'$ and $a^2$, by which the frame can be placed into the bearings of the molding-machine. $c'$ and $c^2$ are guiding-pins, which accurately correspond with the holes in the lugs of the molding-flasks to be used with the frame, as shown, for instance, in Fig. 10, where D is the flask.

The jointed screw-bolts $d'$ $d^2$ serve for connecting the frame A B with either of the flask parts, as represented in Fig. 11.

The pattern-frame has been shown as being divided in two parts for the purpose of allowing the pattern-block to be removed and stored for subsequent use; but instead of making the frame to separate upon the line $o$ $p$, Fig. 3, it may be divided diagonally, as in Fig. 22, or in any other manner which allows the same to be detached from the pattern-block; or, in case of need, it may consist of three or more parts, whereas, if it is not to be taken off the pattern-block no division is required. The shape of the frame may, of course, be varied according to circumstances.

Fig. 22, to which reference has just been made, is a plan of a pattern-frame and block contained therein, divided vertically instead of horizontally, and united by bolts and nuts passing through lips or flanges $i$, formed on the contiguous edges of the two parts, as shown plainly in the figure. The strips or bands which compose the frame are curved in cross-section, as shown in Fig. 23, which is a transverse vertical central section of the block and frame in Fig. 22, with a view to adapting them to hold firmly the pattern-block.

The mode of proceeding is as follows: The original pattern, or a casting serving as such, is molded in the usual manner in sand and in an ordinary two-part molding-flask. The flask is thereupon opened and the pattern removed. Subsequently the pattern-frame A B, which must fit to the flask, is placed between the two flask parts, and into the hollow space or mold thus produced the plaster-of-paris or another one of the above-mentioned substances is cast. After the same has become sufficiently hard the flask and the sand are removed. A copy of one part of the pattern will then appear on the upper face, and a copy of the other part on the lower face of the plaster or other casting; and, considering that this casting or pattern-block is securely incased and held by the pattern-frame A B, it may be handled and made use of in a molding-machine in the same manner as the former pattern-plates.

A modification of the described process, adapted for divided patterns, consists in leaving the pattern parts in the sand and providing them on their planes of separation with hooks or nails; or the pattern parts are temporarily removed and bolts passed through them, on which nuts are screwed, (in a manner similar to what is shown in Fig. 7,) whereupon they are again put into their place, the parts belonging to the upper flask being fixed in the sand by hooks or wires. The pattern parts will thereby become attached to the center part or base of the pattern-block, so as to form one body with the same. If there are two equal undivided patterns on hand—that is to say, two patterns each of which is a model of the entire thing to be cast or molded—the one which is originally used for making the mold may be left in the sand of one flask part, while the second pattern is put into the corresponding hollow of the other flask part. One pattern will thereby become united with one face of the block and the other pattern with its other face, supposing the patterns to be duly provided with hooks, nails, or bolts, as has been described with regard to the divided patterns. The complementary parts of the two patterns will then project from the opposite faces of the block.

Another mode of proceeding consists in combining the first with the second or third method, and is applicable when there is but one undivided pattern. In such case this pattern, duly provided with nails, hooks, or bolts, as heretofore described, may be left in one mold part while the other mold part remains empty. The finished pattern-block will then show a part of the original pattern projecting from one face, while the fac-simile of the embedded part appears as a part of the pattern-block in its other face. A pattern-block of this kind is represented by Figs. 5 to 9, Figs. 5 and 6 showing the two faces of the block, and Figs. 7, 8, and 9 being sections on the lines $x\ y$, $u\ v$, and $w\ z$ of Fig. 5, respectively.

The patterns $M'\ M^2\ M^3$ are held together, with the block F, by the bolts $e$.

$N'\ N^2\ N^3$ are the copies of the embedded parts of the patterns.

The pattern-block may also be cast in two parts, which, being united back to back, form the complete block, as in the previous cases. This modification of the method is shown by Figs. 19, 20, and 21. $A'\ B'$ are the two parts of the pattern-block frame; $F'\ F^2$, the two parts of the pattern-block, which are properly made smooth at the back, and $C'\ D'$ the mold parts. The frame parts $A'$ and $B'$ are screwed together at G and H. When this method is employed the patterns may either be taken out of the sand or left in the same, as in the former cases.

Figure 13:
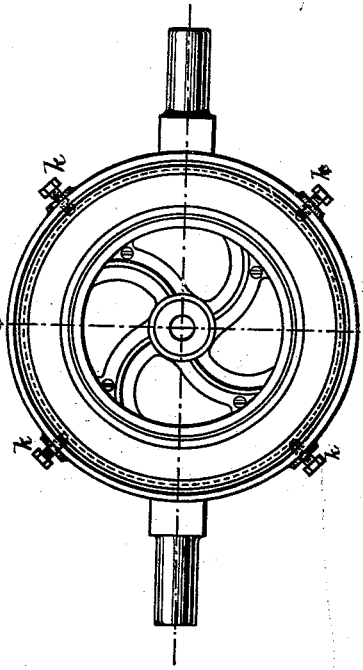
Figure 14:
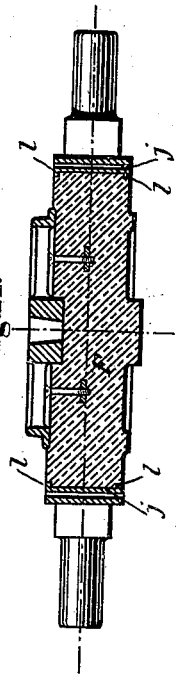
Figure 15:
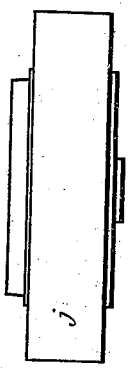

Figs. 13, 14, and 15 represent a pattern-block cast into a ring, Fig. 15, or otherwise shaped separate frame $j$, which is held within the pattern-frame by set-screws $k$. The ring is fixed in proper position in the pattern-frame and the pattern-block is then cast therein. The block is prevented from slipping out of the ring by suitable ledges $l$. When the block is detached from the frame it remains surrounded and secured by the ring or separate frame.

Figure 17:
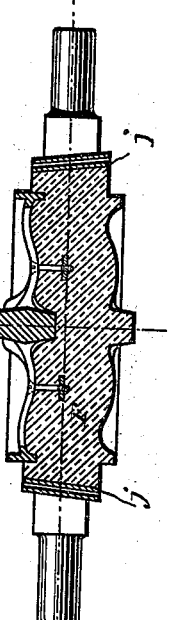
Figure 18:
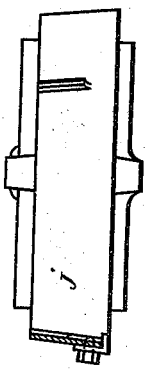

Figs. 16 to 18 show a similar arrangement, which, however, allows the block to be taken out of the ring, &c., this being effected by giving the rings $j$ a slightly tapered or frusto-conical form, as shown.

The models of the runners for pouring the metal into the mold may be formed on the face of the pattern-blocks.

For better preserving the blocks, and for allowing them to be drawn out of the sand more easily, they should be varnished or painted.

The pattern-blocks, when completed, are made use of in the same manner as is described with regard to pattern-plates in the specification of the said patent, A. D. 1876, No. 2,456. The frame, with the block, is put into the molding-machine, one of the flask parts—as, for instance, D, Fig. 10, which fits accurately on the guiding-pins $c'$ and $c^2$—is thereupon placed on the top of the frame A B, and secured thereto by the screw-bolts $d'\ d^2$, in the same manner as shown with regard to flask part C in Fig. 11. When filled with sand and rammed the frame, with the flask D, is turned over and the frame drawn off the flask. The flask part C is then fixed to the side of the frame, now being at the top, (see Fig. 11,) and is thereupon filled with sand and rammed also. After having been detached from B, in the same manner as described with regard to D, the two flask parts are put together, as in Fig. 12.

The flask parts D and C may be arranged in such a manner that they can be drawn off the body of sand contained within them, as described in the English Patent No. 2,275, A. D. 1878.

When the patterns are but small the blocks made from them may be lifted by hand, and in this case the pattern-frame may have handles instead of journals.

The advantages which the described mode of molding presents, as compared with the pattern-plates described in the specification of the English Patent No. 2,456, A. D. 1876, are the following: It renders possible the direct use of all models—i. e., first patterns for making pattern-blocks which may be on hand. It does not necessarily require such models which are larger by double the amount of shrinkage of the metal, as is the case when iron pattern-plates are cast. One pattern-frame will serve for a number of pattern-blocks. It allows the most perfect castings to be made by workmen of but little skill.

I am aware that a system of molding has hitherto been practiced which is called "block" system. The same consists in casting blocks of plaster-of-paris in two separate frames or boxes in such a manner that one of two equal patterns (cast after a master-pattern) adheres to one block, while the other pattern is combined with the second block, and these blocks or false halves are made use of separately for making the mold parts. In the system described in the foregoing, however, the two parts of the pattern, or their copies, or one pattern part and a copy of the other, appear on the two sides of a single pattern-block, or of a block consisting of two parts united into one, so that after one side has been molded from, the pattern-block need but be turned over in the molding-machine for presenting its other side for the molding operation.

I claim as my invention—

1. The method of making pattern-blocks for molding purposes which present on their two sides the complementary parts of the pattern, or one part of the pattern and a copy of the complementary part, or copies of both parts, which consists in casting the said block out of material such as described, which will form blocks separable from the mold in a journaled frame from which it is separable, substantially in the manner hereinbefore described, and for the purposes stated.

2. A pattern-block for molding purposes cast in a frame mounted in and detachably connected with the journaled pattern-frame.

In testimony whereof I have signed my name to this specification in the presence of two subscribing witnesses.

GEORGE WOOLNOUGH.

Witnesses:
HCH. SPRINGMANN,
BERTHOLD ROI.